(12) United States Patent
Lee et al.

(10) Patent No.: US 10,215,990 B2
(45) Date of Patent: Feb. 26, 2019

(54) WEARABLE DEVICE

(71) Applicant: LG ELECTRONICS INC., Seoul (KR)

(72) Inventors: Minjong Lee, Seoul (KR); Wonseok Joo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/742,441

(22) PCT Filed: Aug. 7, 2015

(86) PCT No.: PCT/KR2015/008289
§ 371 (c)(1),
(2) Date: Jan. 5, 2018

(87) PCT Pub. No.: WO2017/022875
PCT Pub. Date: Feb. 9, 2017

(65) Prior Publication Data
US 2018/0203239 A1  Jul. 19, 2018

(30) Foreign Application Priority Data

Aug. 3, 2015 (KR) .......................... 10-2015-0109630

(51) Int. Cl.
*G02B 27/01* (2006.01)
*G02C 11/00* (2006.01)

(52) U.S. Cl.
CPC ......... *G02B 27/0176* (2013.01); *G02B 27/01* (2013.01); *G02B 27/0172* (2013.01); *G02C 11/10* (2013.01); *G02B 2027/0154* (2013.01); *G02B 2027/0161* (2013.01)

(58) Field of Classification Search
CPC .............. G02B 27/0176; G02B 27/017; G02B 2027/0178; G02C 5/22; G02C 5/2254
USPC .................................................. 351/114, 150
See application file for complete search history.

(56) References Cited

U.S. PATENT DOCUMENTS

| 6,181,304 B1 | 1/2001 | Robinson et al. |
| 2011/0273662 A1 | 11/2011 | Hwang et al. |
| 2013/0258271 A1 | 10/2013 | Cazalet et al. |

FOREIGN PATENT DOCUMENTS

| JP | H05191745 | 7/1993 |
| JP | 2010239282 | 10/2010 |

OTHER PUBLICATIONS

PCT International Application No. PCT/KR2015/008289, Written Opinion of the International Searching Authority dated May 2, 2016, 22 pages.

*Primary Examiner* — Ryan D Howard
(74) *Attorney, Agent, or Firm* — Lee, Hong, Degerman, Kang & Waimey

(57) ABSTRACT

A wearable device comprises: a U-shaped bent frame; a flexible part which is located at one end of the frame and of which the shape, bent and deformed by means of external force, is fixed; a main body housing connected to an end of the flexible part; a projector which is mounted on the main body and emits light corresponding to image information; and a transparent screen which is coupled to the main body housing and reflects the light emitted from the projector to supply and image to the wearer's eyes. The wearable device can be deformed to fit the user's head so that the wearing comfort is improved, and the wearable device can be worn even when the user is wearing glasses by detaching the main body housing.

13 Claims, 9 Drawing Sheets

(a)

(b)

WEARABLE DEVICE

CROSS-REFERENCE TO RELATED APPLICATIONS

This application is the National Stage filing under 35 U.S.C. 371 of International Application No. PCT/KR2015/008289, filed on Aug. 7, 2015, which claims the benefit of earlier filing date and right of priority to Korean Application No. 10-2015-0109630, filed on Aug. 3, 2015, the contents of which are all hereby incorporated by reference herein in their entirety.

FIELD

The present disclosure relates to a wearable device which is easy to carry in case of not being used and adjustably deformed to fit a user's head.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Interests in wearable devices have been increasing for users' wearing comfort and there are ongoing studies and researches on diverse mobile terminal which can be worn on glasses, bracelets, watches and even clothes.

A glasses-type mobile terminal which is wearable on a user's face provides a transparent display which is always located in a user's view range to facilitate transmission of information and gain the same images with the user's line of vision consistently. However, such a glasses-type mobile terminal is worn on the user's head so that easy wearing and portability, while the glasses-type mobile terminal is not used, may be major issues.

DETAILED DESCRIPTION OF THE INVENTION

Technical Problem

To overcome the disadvantages, an object of the present invention is to address the above-noted and other problems and to provide a wearable device which is easy to carry in case of not being used and adjustably deformed to fit a user's head.

Technical Solution

To achieve these objects and other advantages and in accordance with the purpose of the embodiments, as embodied and broadly described herein, a wearable device comprises a U-shaped bent frame; a flexible part coupled to one end of the frame and of which the shape is bendable and deformable by an external force; a main body housing connected to one end of the flexible part; a projector mounted in the main body housing and configured to project corresponding light to image information; and a transparent screen coupled to the main body housing and configured to provide an image to wearer's eyes by reflecting the light projected from the projector.

The flexible part may comprise a flexible tube which is bendable, while forming a curve, and the main body housing may be rotatably coupled to the flexible tube along a longitudinal direction of the flexible tube.

The wearable device may further comprise a shaft inserted in the flexible tube; a rotary bracket rotatably coupled to the shaft with respect to a longitudinal direction of the flexible tube and having the main body housing secured thereto; and a plate spring configured to locate the rotary bracket in close contact with the shaft when the rotary bracket is not rotated.

The flexible part may further comprise a flexible housing which covers an outer surface of the flexible tube and forms a continuous surface with the frame.

The main body housing may comprise a first body located in a side of the user's head when the user is wearing the frame on a back of the head; a second body having the transparent screen coupled thereto; and a hinge arranged between the second body and the third body.

The hinge may be rotatable in a range of angles from 0° to 140° which are formed by the first body and the second body.

The main body housing may comprise a first body located in a side of the head when the wearer is wearing the frame on the back of the head; and a third body coupled to the flexible part and detachable from the first body.

The wearable device may further comprise an auxiliary cable having one end coupled to the first body and the other end coupled to the third body to connect the first body and the third body with each other.

One end of the auxiliary cable may further comprise a hook configured to hook the auxiliary cable to the wearer's pair of glasses.

The other end of the auxiliary cable may further comprise a sub-battery.

The length of the frame may be adjustable.

The wearable device may further comprise a rubber band having one end and the other end coupled to the frame, spaced apart from each other, and located in the U-shape.

When the wearer is wearing the wearable device, a first point located in one end of the frame, a second point located in the other end of the frame and a third point located in a middle area of the frame or the rubber band may be secured to the head.

An edge portion of the frame may be bent in Z-axis from the U-shaped plane.

The wearable device may further comprise a battery housing located in the other end of the frame and in which a battery is mounted; and a battery cable configured to electrically connect the battery housing and the main body housing with each other and penetrates the inside of the frame.

Advantageous Effects

The wearable device in accordance with the present disclosure has following effects.

According to at least one embodiment mentioned above, the wearable device may be deformable to fit the user's head and the sense of the wearing may be enhanced. Also, the main body housing may be detachable so that the wearable device may be worn even when the user is wearing the glasses.

Furthermore, the wearable device may be carried in the state of being worn on the neck or folded so that the portability can be enhanced and the user may not always wear it on the head.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
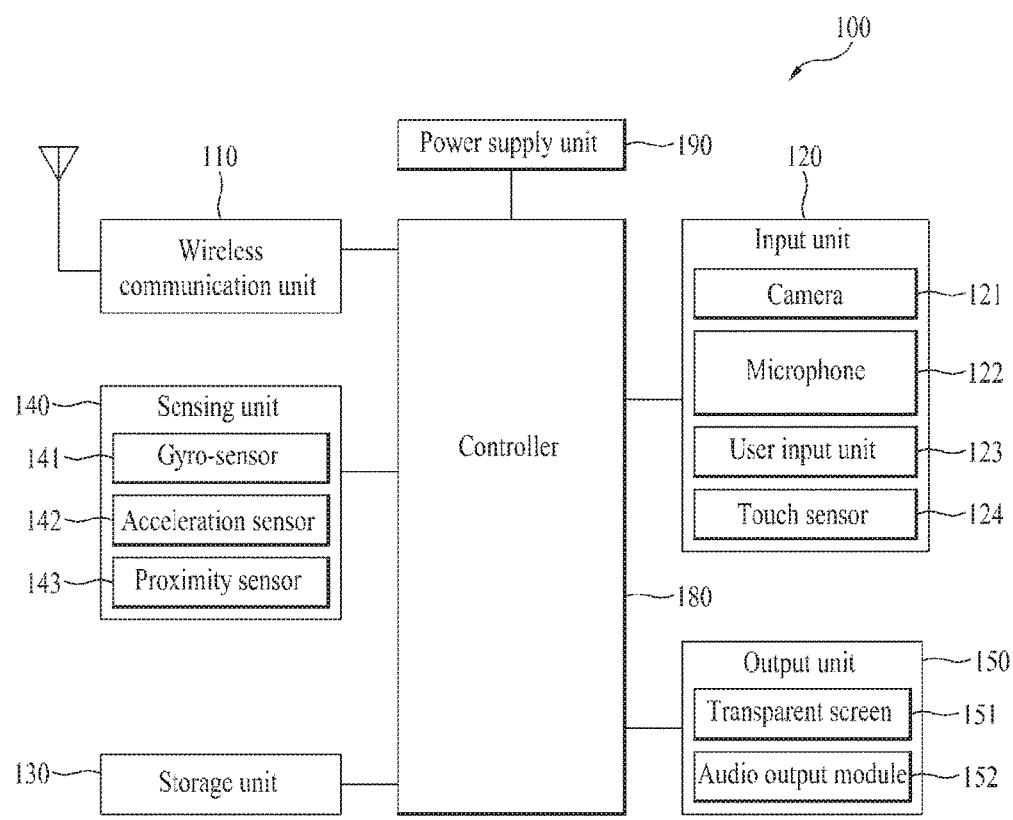
FIG. 1 is a block diagram of a wearable device in accordance with the present disclosure.

FIG. 1 is a block diagram of a wearable device 100 in accordance with the present disclosure. The wearable device 100 includes a wireless communication unit 110, an input unit 120, a sensing unit 140, an output unit 150, a storage unit 130, a controller 180 and a power supply unit 190. The elements shown in FIG. 1 are not necessarily provided and the wearable device 100 including more or less of the elements may be realized.

Hereinafter, the elements will be described in detail sequentially.

The wireless communication unit 110 may include one or more of modules to facilitate wireless communicate between the wearable device 100 and a wireless communication system or a network in which the wearable device 100 is located. As one example, the wireless communication unit 110 may include a mobile communication module, a wireless internet module, a short range communication module and a location information module.

The mobile communication module is configured to transceiver a wireless signal with one or more of a base station, an external terminal and a server on a mobile communication network such as GSM (Global System for Mobile communications), CDMA (Code Division Multiple Access), WCDMA (Wideband CDMA) (not limited thereto). Such a wireless signal may include diverse types of data according to a voice call signal, a video call signal and a texture/multimedia message transceiving.

The wireless internet module means the module for wireless internet connection and may be a built-in type or an external type. Examples of the wireless internal technique include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) (Embodiments of the present disclosure are not limited thereto).

Considering that the wireless internal connection is realized by Wibro, HSDPA, GSM, CDMA, WCDMA and LTE, the wireless internet module configured to perform the wireless internet connection via such the mobile communication network may be understood as one of the mobile communication modules.

The short range communication module means the module for short range communication. Examples of the short range communication include Bluetooth™, RFIF (Radio Frequency Identification), IrDA (Infrared Data Association), UWB (Ultra-Wideband), and ZigBee.

The location information module 115 is the module configured to detect or identify a position of the wearable device 100. According to the current techniques, the GPS technique calculates distance information from three or more satellites and precise time information and applies trigonometry to the calculated information, only to calculate 3-dimensional current location information based on the latitude, longitude and altitude. The method for calculating the location/time information by using three satellites and correcting errors of the calculated location and time information by using one satellite is well-known and broadly used. Also, the GPS module is capable of calculating speed information by continuous calculation of the current locations in real time.

Referring to FIG. 1, the input unit 120 is configured to input an audio signal or a video signal. The input unit 120 may include a camera 121, a microphone 122, a user input unit 123 and a touch sensor 124.

The camera 121 may process image frames 101 of still pictures or video obtained by using an image sensor in a video or image capture mode. The processed image frames 101 can be displayed on a screen 151 and the processed image frames 101 may be stored in memory 130 or transmitted to an external device. According to usage environments, two or more cameras 121 may be provided.

The microphone 122 is generally implemented to permit external audio input to the mobile terminal 100 in a call or record mode and to process the audio input signal into electrical voice data. The processed voice data may be converted into a transmittable type to a mobile communication base station by the mobile communication module and output in the call mode. Diverse assorted noise removing algorithms may be realized in the microphone 122 to remove unwanted noise generated in the course of receiving the external audio signal.

In case of acquiring the still image, the camera 121 may extract information from the still image. It might be waste of processes for an image recognizing unit to acquire information from a plurality of still images and for the controller to process the information. Also, when provided with the unnecessary extracted information, the user is likely to feel uncomfortable in using the glasses-type wearable device 100.

Only the required information may be extracted based on a command input via the user input unit 123 provided in the frame 101 by the user or a voice command for acquiring image information. Or, the required information may be extracted when the camera 121 photographs images of the same object for a preset time period or more to which is given the user's look for a preset time period or more.

Alternatively, when the object the user approaches occupies a lot of the user' view, it may be determined that the user is keeping eyes on the object. Accordingly, when one object occupies a preset range or more of the images recognized by the camera 121, the information related with the object may be extracted.

It is difficult to provide the wearable device 100 with a keyboard but a button type user input unit 123 may be provided in the frame 101 to facilitate the user's input of frequently used commands. For example, a command for commanding the camera to capture the image viewed by the user or extract information from the image or a command for controlling the volume output from an audio output unit 152.

Diverse types of user input units 123 may be applicable by a method for generating a signal by recognizing a physical pressure applied to a metal dome or a method for recognizing a touch from the user's hand by using a touch sensor 124.

The sensing unit 123 is configured to sense states and surroundings of the mobile terminal 100. Examples of the sensing unit 123 may include a gyro-sensor 141 and an acceleration sensor 142.

The gyro-sensor 141 is a device for sensing slope variation of the mobile terminal and configured to detect variations of three axes including X-axis, Y-axis and Z-axis which lie at right angles to each other. The gyro-sensor is called 'the angular velocity sensor', because it is capable of sensing the slope movement of the mobile terminal body by sensing the momentums of the rotation on each axis.

A conventional gyro-sensor has a shape of a top, with three axes. Recently, an optical gyro and a vibrating gyro for enhancing accuracy and minimizing the size are introduced and loaded in a compact-sized electronic product such as a mobile terminal. In addition, 6-axes sensor realized as MEMS module may be used as the gyro-sensor 141.

The gyro-sensor used in the embodiment of the present disclosure may include all types of gyro-sensors capable of sensing the slope and movement of the wearable device 100, not limited to the types mentioned above.

The acceleration sensor 142 is configured to measure a dynamic force such as acceleration of the wearable device 100 and also vibration and shocks from variation of accelerations. When acceleration is applied to an object with mass, a predetermined force is generated and variation of the acceleration generated by the force is sensed by the acceleration sensor 142.

The proximity sensor 144 may be arranged in a frame and configured to sensor an object approaching the wearable device 100. The proximity sensor 141 means the sensor for sensing presence or absence of an object approaching a preset detection surface or an object located near the surface by using an electromagnetic field, infrared rays, or the like without a mechanical contact. The proximity sensor has a longer usage life and higher diversity than a touch sensor.

Examples of the proximity sensor include a transmission photo-sensor, a direct-reflect photo-sensor, a mirror-reflect photo-sensor, a high-frequency oscillation type proximity sensor, a capacitive proximity sensor, a magnetic proximity sensor and an infrared proximity sensor. When a touchscreen is a capacitive type, proximity of a pointer may be detected based on variation of an electric field generated by the proximity of the pointer. In this instance, the touch screen (or touch sensor) may be used as the proximity sensor.

The output unit 150 is configured to generate the outputs related with sight, hearing and touch and includes a transparent screen 151 and an audio output unit 152.

The screen 151 is arranged in front the user's eye, similar to a lens of glasses. The screen 151 arranged in front of the user's eye is transparent to allow the user to see an object in front and configured to output a text or an image on the screen so as to provide information to the user.

A typical example of the transparent screen 151 is TOLED (Transparent OLED). The transparent screen 151 may have a rear structure which is also a light transmission structure. Accordingly, the user is able to see an object located behind the terminal body via the area occupied by the screen 151 of the terminal body 151.

The audio output unit 152 may output the audio data received from the wireless communication unit 110 or stored in the storage unit 130 in a call signal receiving mode, a call mode or a record mode, a voice recognizing mode and a broadcast receiving mode. The audio output unit 152 is also implemented to output a sound signal related with the functions performed in the wearable device 100 (e.g., a call signal receiving sound and a message receiving sound). Such the audio output unit 152 may include a receiver, a speaker and a buzzer.

The storage unit 130 may store programs for processing and control of the controller 180 and perform a function for temporarily storing data. New input data may be stored and the former stored data may be extracted to be used. The storage function of the storage unit 130 may be expanded by using an embedded storage device or an auxiliary storage device such as SD card.

The controller 180 may typically control the general operations of the mobile terminal 100. The controller 180 may be implemented to transceive diverse signals or process the input data by controlling the wireless communication unit 110 or provide the user with information by controlling the screen 151 and the audio output unit. The image recognizing unit 125 and the voice recognizing unit 126 mentioned above may be configured as parts of the controller 180.

The controller 180 in accordance with the present disclosure may be implemented to extract information from the image acquired by the camera 121 and compare the extracted information with preset information or output the related information extracted from the storage unit 130 on the transparent screen 151 or search through the related information on the internet.

The power supply unit 190 is configured to applied an external power and an internal power by the control of the controller 180 and supply the electric power needed in operating the elements. For example, the power supply unit 190 may include a battery, a connection port, a power supply controller and a charge monitoring unit. The battery may be an embedded type chargeable battery and detachably loaded in the frame for charging.

The embodiments described herewith may be realized in a computer or a readable record media, which is readable with similar devices, by using software, hardware or combination of the two.

Figure 2:
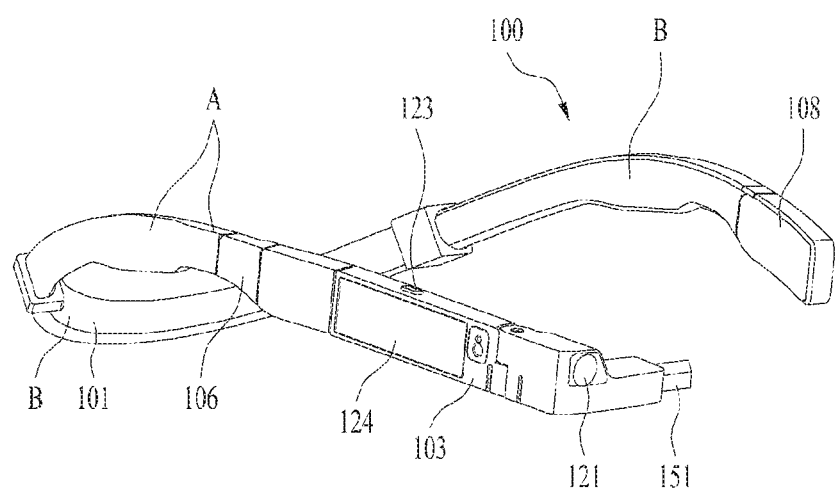
FIG. 2 is a perspective diagram illustrating one example of the wearable device in accordance with the present disclosure.
Figure 3:
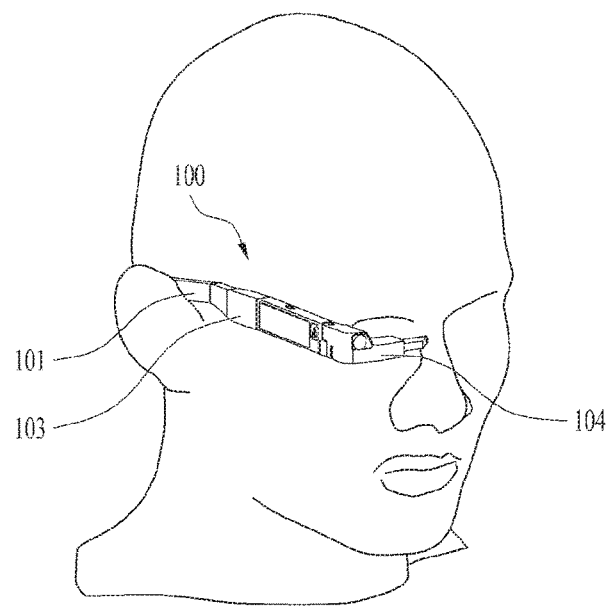
FIG. 3 is a diagram a state where the wearable device is worn.
Figure 3:
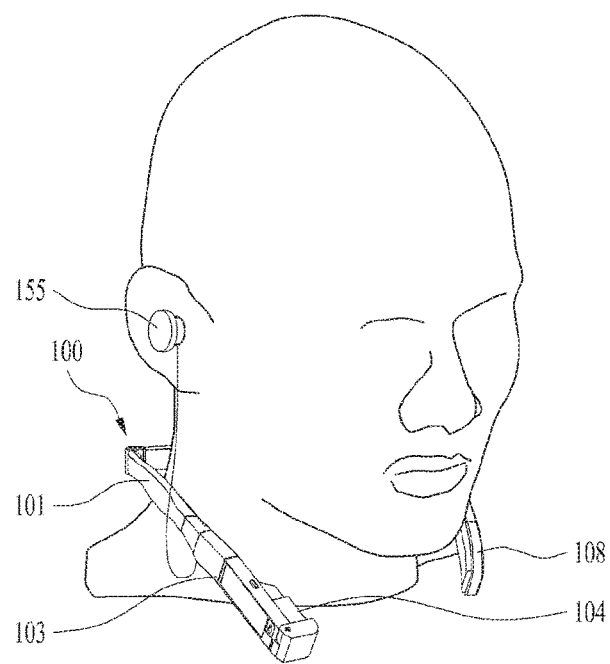

FIG. 2 is a perspective diagram illustrating one example of the wearable device 100 in accordance with the present disclosure. FIG. 3 is a diagram a state where the wearable device 100 is worn. The wearable device 100 may include a frame 101, a main body housing 103, a battery housing 108, a transparent screen 151, a camera 121 and a touch sensor 124.

The frame 101 is a part which is worn on the use's body part when the user is wearing the wearable device 100 and it may be bent in a U-shape to surround a back side of the user or wearer's head. When the frame 101 is located on a front head part, it is difficult for the user wearing glasses to wear the wearable device 100 so that the user has to gird the front head part with a large frame 101 uncomfortably. The embodiments of the present disclosure may solve such the disadvantage by locating the frame 101 on the rear head part to reduce the discomfort the user feels when wearing the wearable device 100.

Both ends of the U-shaped frame 101 may be located in both sides of the wearer's head and a center portion is located in a back side of the head. To support the weights of the main body housing 103 and the battery housing 108, the edges of the frame 101 may be bent slightly to locate the frame 101 a little under the most projected area of the back of the head.

More specifically, both ends of the U-shaped frame 101 are bent in a Z-axis direction from the plane of the U-shaped profile so as to be bent downwardly as shown in FIG. 2. The center portion (C) of such the bent frame 101 may be located under the most projected portion of the wearer's back head part to support the wearable device 100 inclined downwardly by the weight of the main body housing 103.

A first point (A) and a second point (B) of the frame 101 which may contact with both sides of the wearer's head may be supporting points. A third point (C) of the frame 101 which may contact with the back of the head and both the main body housing 103 and the battery housing 108 which are located in both ends of the frame 101 may be disposed on the wearer's head, while is keeping a balance. The first point (A) or the second point (B) may contact with the bone located near the ear, while contacting with the wearer's head, so that a bone conduction audio output unit (152, see FIG. 6) may be further provided in the first point (A) or the second point (b) of the frame 101.

A projector 153 configured to emit the light corresponding to the image information and the transparent screen 151 configured to provide the user's eyes with an image by reflecting the light emitted from the projector may be coupled to the main body housing 103 located in one end of the frame 101. The transparent screen 151 is located in front of the wearer's eye when the frame 101 is worn on the head as shown in FIG. 3 (*a*).

As shown in FIG. 3 (*b*), the wearable device 100 may be worn on the user's neck unless the display of the wearable device 100 is not used. An earphone 155 may be connected to the wearable device 100 to use the wearable device 100 as wireless sound equipment.

The projector 153 may provide the image to the transparent screen 151 from a lateral surface of the transparent screen 151 and the transparent screen 151 includes a prism screen for reflecting the image to the user's eye. The transparent screen 151 may be arranged corresponding to one or more of the left and right eyes to directly provide the image to the user's eyes. The transparent screen 151 may show the user the projected image together with the general front view (the range viewed by the user with the eyes). Accordingly, the image projected from the projector 153 may be seen, while being overlapped with the general range of view.

The mobile terminal may provide AR (Augmented Reality) to show a virtual image overlapped with a real image or background by using such characteristics of displays.

The camera 121 is arranged adjacent to one or more of the left and right eyes and configured to photograph an image in front of the eyes. As located near the eyes, the camera 121 may acquire the scenes viewed by the user as the images.

A user input unit may be provided in the main body housing 103 and the user input unit may be operated by a tactile manner when the user applies a tactile input such as touch and push or by a touch manner when the user applies a touch input via the touch sensor 124. The touch manner facilitates diverse inputs by using a small area.

The user's gestures sensed by the camera 121, the proximity sensor or a gesture sensor may be recognized as the user's command and the corresponding control to the recognized command may be performed or a user's voice command by using the microphone. The user is able to control the wearable device 100 by diverse manners via the overall input unit.

The battery housing 108 may be coupled to the other end of the frame 101. To balance the right and the left of the frame 101, the battery 190 is arranged in the opposite side of the frame 101. A battery cable may be further provided to electrically connect the main body housing 103 and the battery housing 108 with each other via the frame 101. The battery housing 108 may be configured as a replaceable detachable type.

Figure 4:
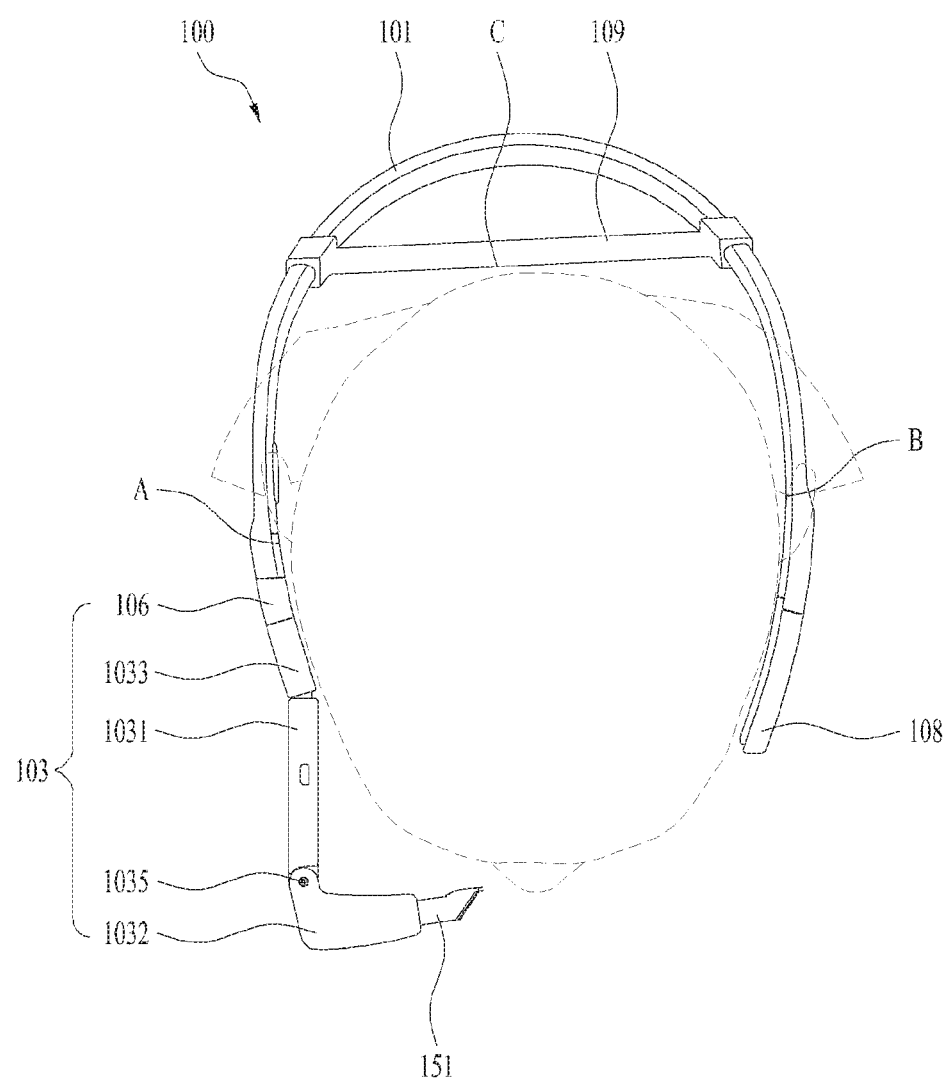
FIG. 4 is a diagram to describe a method for adjusting the wearable device based on the size a user's head.

FIG. 4 is a diagram to describe a method for adjusting the wearable device 100 according to the size of the wearer's head. The frame 101 worn on the head is likely not to fit the user's head, because every user has a different head size and shape. To solve the disadvantage, a rubber band 109 may be further provided and crosses an inside of the U-shaped portion of the frame 101, with both ends fixed to the frame 101.

The rubber band 109 may be made of a flexible material with elasticity such as rubber, polyurethane or silicon and it is deformable to fit the shape of the user's head in the length and shape. Compared with an injection-molded material, the flexible material has a higher frictional force and it is easy to fix the rubber band to the back of the wearer's head.

The ends of the rubber band 109 may be fixed to the frame 101 or inserted in the frame 101 to move along the frame 101. In case of further comprising the rubber band 109, the third point (C) may be the center of the rubber band 109.

Figure 5:
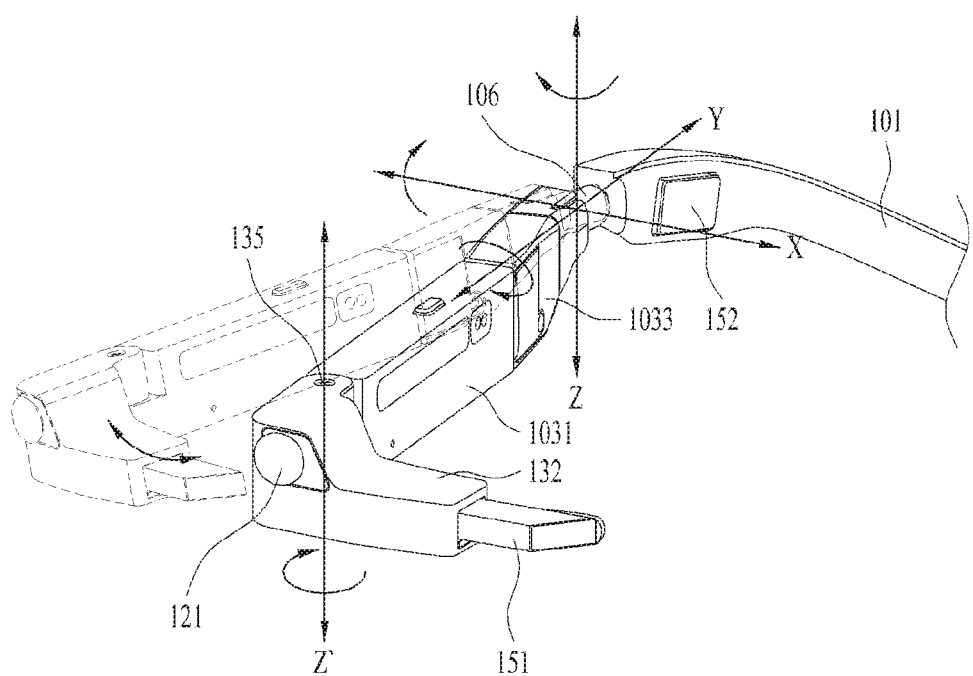
FIG. 5 is a diagram illustrating the movement of a flexible part provided in the wearable device.

FIG. 5 is a diagram illustrating the movement of a flexible part 106 provided in the wearable device 100. The wearable device 100 in accordance with the present disclosure may further include the flexible part 106 provided in a connecting portion between the frame 101 and the main body housing 103 to adjust the location of the transparent screen according to the wearer's body shape. The flexible part 106 shown in FIG. 5 may be rotatable in all directions.

Figure 6:
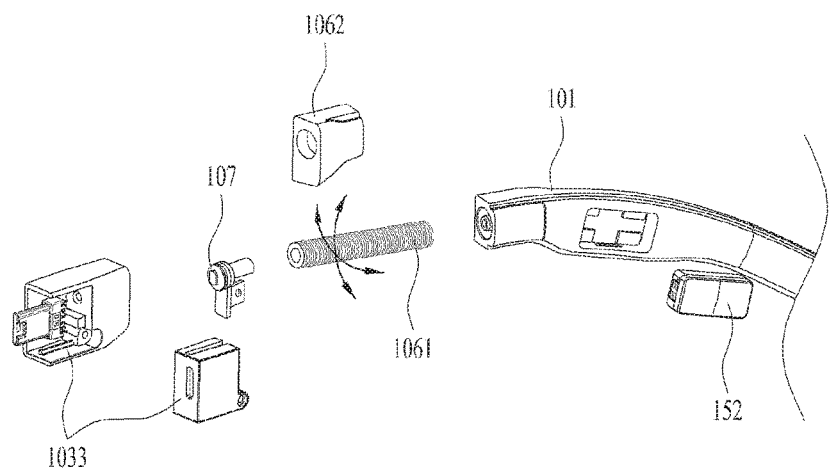
FIG. 6 is an exploded perspective diagram illustrating the flexible part of the wearable device.

FIG. 6 is an exploded perspective diagram illustrating the flexible part 106 of the wearable device 100. The flexible part 106 includes a hollow flexible tube 1061. One end of the flexible tube 1061 is coupled to the frame 101 and the other end is coupled to the main body housing 103. As the flexible tub 1061 is bending, the location of the main body housing 103 may be relatively changed with respect to the frame 101.

The flexible tube 1061 is bendable in diverse directions according to the direction in which a force is applied thereto. When the applied force is removed in the bent state, the flexible tube 1061 keeps the bent state. The flexible tube 1061 may be bendable with respect to a perpendicular direction to its extended direction as an axis, so as to adjust the location of the main body housing 103 coupled to the end of the flexible tube 1061.

A flexible housing 1062 may be further provided and the flexible housing 1062 is bendable in response to the deformation of the flexible tube 1061, while surrounding an outer surface of the flexible tube 1061. Both ends of the flexible tube 1061 are coupled to the frame 101 and the main body housing 103, respectively, so that the flexible housing 1062 may be shorter than the flexible tube 1061. The flexible housing 1052 may define the exterior of the wearable device 100 and it is preferred that the flexible housing 1062 forms a continuous surface together with the main body housing 103.

The rotation performed with respect to the extended direction of the flexible tube 1061 as the axis is difficult to realize so that the flexible tube 1061 may rotatably couple the main body housing 103 and the flexible part 106 to each other by using a coupling structure 107 rotatable on the extended direction (Y-axis) of the flexible tube 1061 as the axis.

Figure 7:
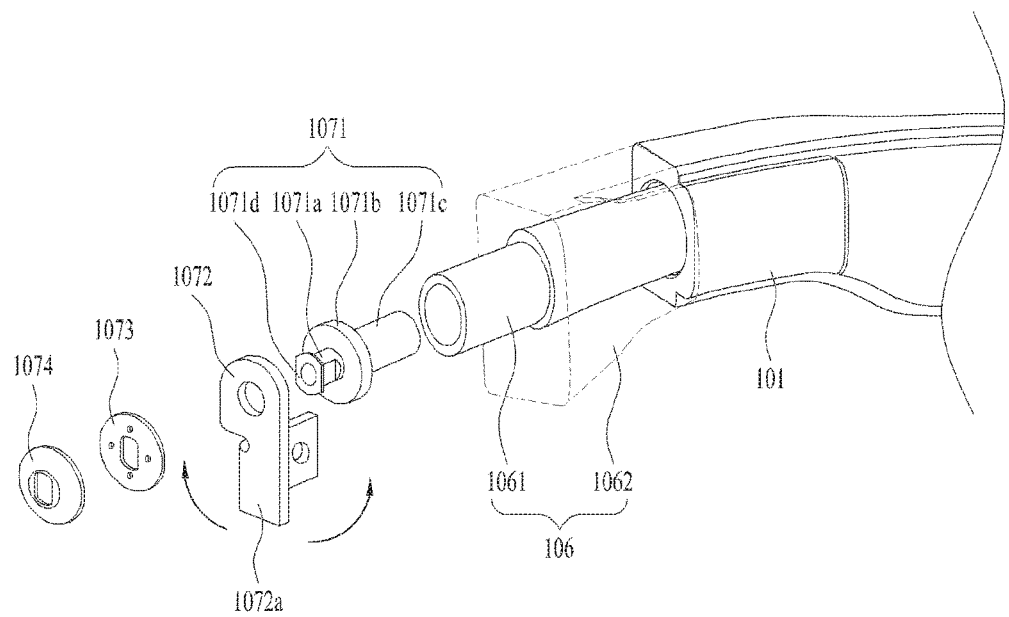
FIG. 7 is an exploded perspective diagram a coupling structure between a flexible tube and a main body housing in the wearable device.

FIG. 7 is an exploded perspective diagram the coupling structure 107 between the flexible tube 1061 and the main body housing 103 of the wearable device 100. The coupling structure 107 may include a shaft 1071, a rotary bracket 1072 and a plate spring 1074.

One end 1071c of the shaft 1071 is fixedly inserted in the flexible tube 1061 and the rotary bracket 1072 rotatable on the shaft is fitted to the other end 1071a of the shaft 1071. A protrusion 1071d may be projected from a rime of the other end 1071a of the shaft not to release the rotary bracket 1072 from the shaft 1071. A disk 1071d may be further provided to distinguish the end inserted in the flexible tube 1061 and the other end 1071a having the rotary bracket 1072 inserted therein from each other. The rotary bracket 1071 is located between the disk 1071d and the protrusion 1071d.

The rotary bracket 1072 inserted in the shaft 1071 includes a fixing portion projected in a perpendicular to the shaft to be coupled to the main body housing 103. The plate spring 1074 may be provided to secure the shaft rotated a preset angle. The plate spring 1074 is made of a metallic member curved in a dome shape. When a force is applied to the plate spring, the dome shape is deformed. When the applied force is removed, the plate spring restitutes to the dome shape by elasticity.

When the rotary bracket 1072 is rotated, the plate spring 1074 of the present disclosure is deformed to form the space for the rotation of the rotary bracket 1072 between the rotary bracket 1072 and the disk 1071b. Once the rotation of the rotary bracket 1072 is complete, the rotary bracket 1072 becomes in close contact with the disk 1071b of the shaft 1071 by the elasticity of the plate spring 1074 to secure the location of the rotary bracket 1072. In other words, the shaft 1071 is fixed to the frame 101 and the rotary bracket 1072 and the main body housing 1071 are rotated on Y-axis to adjust the location of the transparent screen 151 coupled to the main body housing 103.

Figure 8:
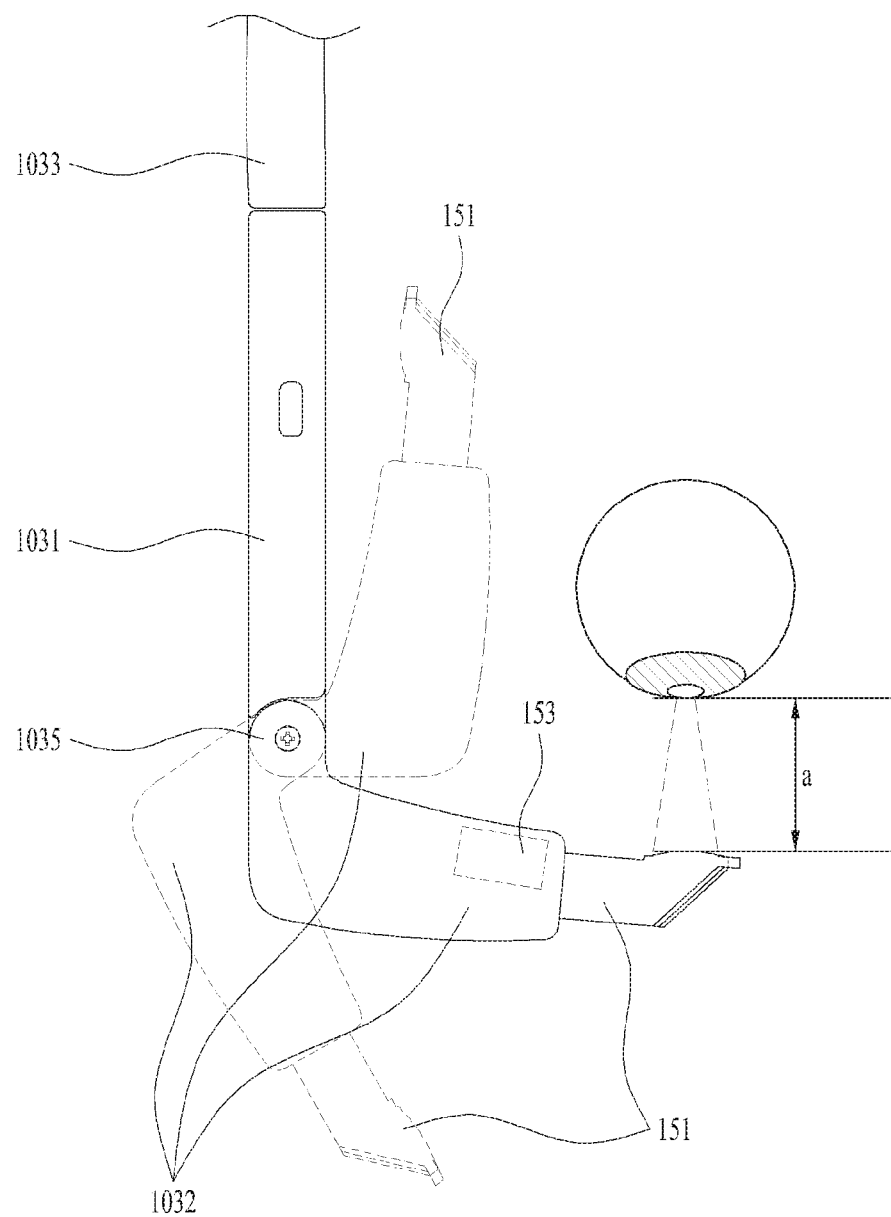
FIG. 8 is a diagram to describe an operation of a hinge which is provided in the wearable device.

FIG. 8 is a diagram to describe an operation of a hinge 1035 which is provided in the wearable device 100. The main body housing 103 may include a first body 1031 located in a side of the user's head; a second body 1032 in which the projector 153 is mounted and the transparent screen 151 is coupled; and a hinge 1035 configured to connect the first body 1031 and the second body 1032 with each other.

The hinge 1035 may be located in a position (a) in which the first body 1031 and the second body 1032 form an angel of 90 degrees as a basic one, more specifically, a position in which the transparent screen 151 is distant approximately 18 mm from the user's eyes as an optimal one. As every user has a different head size and different eye locations, so that the location of the transparent screen 151 has to be adjusted to fit every user. The flexible part 106 is bent or the angle between the first body 1031 and the second body 1032 is adjusted, to adjust the transparent screen 151.

The hinge 1035 may be bent and folded until the angle formed by the first and second bodies 1031 and 1032 reaches 0°. When the hinge 1035 is bent inwardly, the wearable device 100 may become easy to carry and easily carried in a cradle. When the wearable device 100 is carried in a state where the first and second bodies 1031 and 1032 get widened, the hinge 1035 might be damaged by the bodies hooked to each other or some other objects. However, when the wearable device 100 is carried in a state where the first and second bodies 1031 and 1032 are bent and folded at 0°, the disadvantage of such damage may be solved. Even when the wearable device 100 is worn on the neck as shown in FIG. 3 (b), the first and second bodies 1031 and 1032 are folded and then not interfered with to facilitate comfortable and convenient hand-carry.

The hinge 1035 is rotatable in a preset range even outwardly, so that the hinge 1035 may be located spaced an optimal distance apart from the user's eyes, while rotated in a range of 0°~140° and the convenience of hand-carry may be enhanced.

Figure 9:
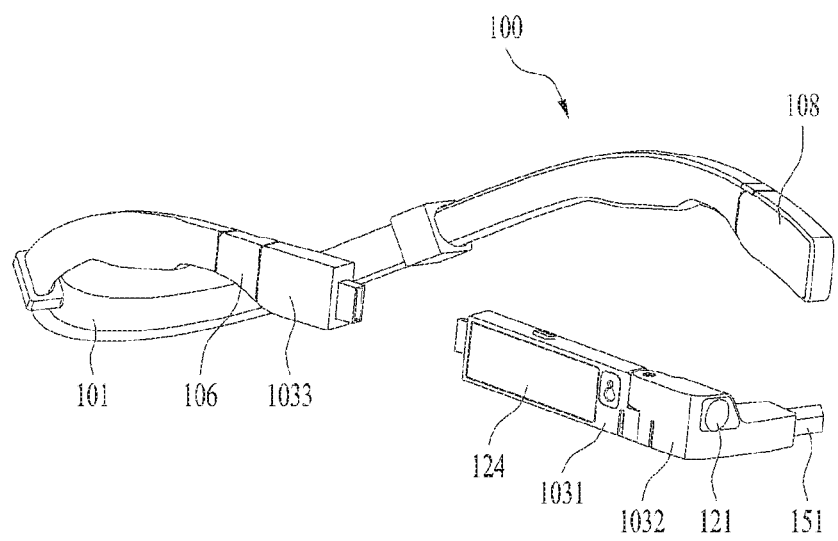
FIG. 9 is a diagram illustrating a state where a first housing and a second housing are decoupled from each other in the wearable device.
Figure 10:
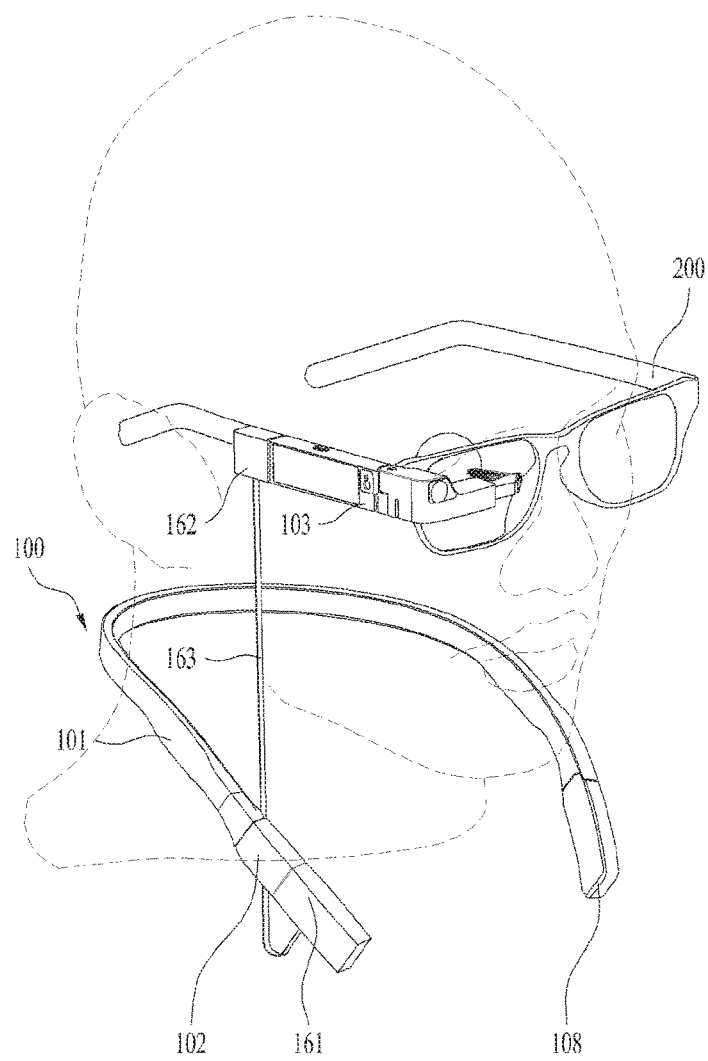
FIG. 10 is a diagram to describe one usage embodiment in the state where the second housing and the first housing of the wearable device are decoupled from each other.

FIG. 9 is a diagram illustrating a state where a first housing and a second housing are decoupled from each other in the wearable device 100. FIG. 10 is a diagram to describe one usage embodiment in the state where the second housing and the first housing of the wearable device 100 are decoupled from each other. As shown in FIGS. 9 and 10, the main body housing 103 of the wearable device 100 in accordance with the present disclosure may be detachable from the frame 101.

More specifically, the main body housing 103 includes a first body 1031 located in the side of the user's head; and a third body 1033 connected with the flexible part 106. The first body 1031 and the third body 1033 may be detachable as shown in FIG. 9. After detached from each other, only the first body 1031 and the second body 1032 may be rested in the cradle and carried separately.

Alternatively, the user wearing glasses shown in FIG. 10 is able to detach the first body 1031 and the second body 1032 and connect them with the pair of the glasses. To connectedly hook them to the pair of the glasses, a hook may be formed in the first body 1031. After detached from the third body 1033, a hook 162 may be connected to an end of the first body 1031 to connect the first body to the pair of the glasses.

At this time, when the battery 190 is provided in the first main body, the battery 190 is operable as its power or an auxiliary cable 163 may be used so as to supply the power transmitted from the large-capacity power supply unit 190 provided in the battery housing 108 to the battery 190.

One end 162 of the auxiliary cable 163 may be coupled to the first body 1031 and the other end 263 to the second body 1032 to supply the power transmitted from the power supply unit 190 located in the battery housing 108. Moreover, a sub-battery 161 may be further provided in the other end of the auxiliary cable 163 to supply additional electric power.

According to at least one of the embodiments mentioned above, the wearable device 100 may be deformable to fit the user's head and the sense of the wearing may be enhanced. Also, the main body housing 103 may be detachable so that the wearable device may be worn even when the user is wearing the glasses.

Furthermore, the wearable device may be carried in the state of being worn on the neck or folded so that the portability can be enhanced and the user may not always wear it on the head.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A wearable device comprising:
   a U-shaped frame;
   a flexible part coupled to one end of the frame and of which the shape is bendable and deformable by an external force;
   a main body housing connected to one end of the flexible part;
   a projector mounted in the main body housing and configured to project corresponding light to image information; and
   a transparent screen coupled to the main body housing and configured to provide an image to wearer's eyes by reflecting the light projected from the projector,
   wherein the main body housing comprises,
   a first body;
   a second body having the transparent screen coupled thereto; and
   a hinge arranged between the first body and the second body.

2. The wearable device of claim 1, wherein the flexible part comprises a flexible tube which is bendable while forming a curve, and
   the main body housing is rotatably coupled to the flexible tube along a longitudinal direction of the flexible tube.

3. The wearable device of claim 2, further comprising:
   a shaft inserted in the flexible tube;
   a rotary bracket rotatably coupled to the shaft with respect to a longitudinal direction of the flexible tube and having the main body housing secured thereto; and
   a plate spring configured to locate the rotary bracket in close contact with the shaft when the rotary bracket is not rotated.

4. The wearable device of claim 2, wherein the flexible part further comprises,
   a flexible housing which covers an outer surface of the flexible tube and forms a continuous surface with the main body housing.

5. The wearable device of claim 1, wherein the hinge is rotatable in a range of angles from 0° to 140° which are formed by the first body and the second body.

6. The wearable device of claim 1, further comprising:
   an auxiliary cable having one end coupled to the first body and the other end coupled to the third body to connect the first body and the third body with each other.

7. The wearable device of claim 6, wherein one end of the auxiliary cable further comprises a hook configured to hook the auxiliary cable to the wearer's pair of glasses.

8. The wearable device of claim 6, wherein the other end of the auxiliary cable further comprises a sub-battery.

9. The wearable device of claim 1, wherein the length of the frame is adjustable.

10. The wearable device of claim 1, further comprising:
    a rubber band having one end and the other end coupled to the frame, spaced apart from each other, and located in the U-shape of the frame.

11. The wearable device of claim 10, wherein when the wearer is wearing the wearable device, a first point located in one end of the frame, a second point located in the other end of the frame and a third point located in a middle area of the frame or the rubber band are secured to the head.

12. The wearable device of claim 1, wherein an edge portion of the frame is bent in Z-axis from the U-shaped plane of the frame.

13. The wearable device of claim 1, further comprising:
    a battery housing located in the other end of the frame and in which a battery is mounted; and
    a battery cable configured to electrically connect the battery housing and the main body housing with each other and penetrates the inside of the frame.

* * * * *